(12) United States Patent
Ponikiewski et al.

(10) Patent No.: US 11,827,288 B2
(45) Date of Patent: Nov. 28, 2023

(54) GEARBOX ASSEMBLY FOR AN ELECTRIC POWER STEERING APPARATUS

(71) Applicant: ZF Steering Systems Poland Sp. Z.o.o., Czechowice-Dziedzice (PL)

(72) Inventors: Pawel Ponikiewski, Pewel Mala (PL); Artur Wojtalik, Katowice (PL); Dawid Klimek, Żywiec (PL); Damian Uchyla, Strumień (PL); Agnieszka Hruby, Bielsko-Biala (PL); Sebastian Ciaglo, Czernichow Malopolskie (PL); Michal Majzel, Czarków (PL)

(73) Assignee: ZF Steering Systems Poland Sp. Z o. o, Czechowice-Dziedzice (PL)

( * ) Notice: Subject to any disclaimer, the term of this patent is extended or adjusted under 35 U.S.C. 154(b) by 0 days.

(21) Appl. No.: 17/858,157

(22) Filed: Jul. 6, 2022

(65) Prior Publication Data
US 2023/0024875 A1    Jan. 26, 2023

(30) Foreign Application Priority Data

Jul. 23, 2021  (EP) ..................................... 21461570
Aug. 18, 2021  (GB) ..................................... 2111856

(51) Int. Cl.
*B62D 5/04*   (2006.01)
*F16H 57/021*   (2012.01)
(Continued)

(52) U.S. Cl.
CPC ......... *B62D 5/0403* (2013.01); *B62D 5/0454* (2013.01); *F16H 57/021* (2013.01);
(Continued)

(58) Field of Classification Search
CPC ... B62D 5/0403; B62D 5/0454; F16H 57/021; F16H 57/029; F16H 57/039; F16H 2057/0213
See application file for complete search history.

(56) References Cited

U.S. PATENT DOCUMENTS 2,715,822 A    8/1955  Anderson
6,491,131 B1  12/2002  Appleyard
(Continued)

FOREIGN PATENT DOCUMENTS

CN    107253492 A    10/2017
DE    112016001415 T5   4/2018
(Continued)

*Primary Examiner* — Daniel D Yabut
(74) *Attorney, Agent, or Firm* — Kristin L. Murphy

(57) ABSTRACT

A gearbox assembly for power take off from an electric motor of an electric power assisted steering apparatus comprises a gearbox housing which houses a worm shaft and a gear wheel. The worm shaft incorporates one or more external helical worm teeth. A main bearing assembly supports the worm shaft at an end closest to the motor. A tail bearing assembly supports the worm shaft at an end furthest from the motor. At least the tail bearing assembly is free to move relative to the housing through a limited range of motion that enables the worm shaft to move radially away from an axis of the wheel gear. A piston is slidingly received within a bore in an end of the wormshaft and has a has a head at an end facing the motor which connects with an output shaft of the motor. An interface between the recess of the piston and the protrusion of motor shaft defines a pivot axis of the worm shaft. A spring located within the bore in the end of the worm shaft and is compressed between the worm shaft. The piston has a tapered shoulder located within the bore that increases in diameter from an end furthest from the motor towards an end nearest the motor. The gearbox assembly further includes an annular o-ring that sits on the
(Continued)

tapered shoulder, the spring acting on the piston through the o-ring whereby movement of the wormshaft towards the motor shaft compresses the spring which in turn drives the o-ring along the tapered shoulder until the o-ring becomes wedged between the piston and the inner wall of the bore of the wormshaft.

7 Claims, 3 Drawing Sheets

(51) Int. Cl.
    *F16H 57/029*     (2012.01)
    *F16H 57/039*     (2012.01)

(52) U.S. Cl.
    CPC ......... *F16H 57/029* (2013.01); *F16H 57/039* (2013.01); *F16H 2057/0213* (2013.01)

(56) References Cited

U.S. PATENT DOCUMENTS

| | | | |
|---|---|---|---|
| 2002/0195893 A1* | 12/2002 | Kobayashi | H02K 7/081 |
| | | | 310/83 |
| 2015/0075899 A1* | 3/2015 | Kikuchi | B62D 5/0403 |
| | | | 180/444 |
| 2016/0194024 A1* | 7/2016 | Kikuchi | F16H 1/16 |
| | | | 180/444 |
| 2018/0073627 A1 | 3/2018 | Gibbs | |
| 2020/0156697 A1* | 5/2020 | Jordan | F16H 55/24 |
| 2020/0217411 A1* | 7/2020 | Appleyard | F16H 57/039 |
| 2020/0385050 A1* | 12/2020 | Liesenfeld | F16H 55/22 |

FOREIGN PATENT DOCUMENTS

| | | | | |
|---|---|---|---|---|
| DE | 112017004439 T5 | 6/2019 | | |
| DE | 102018123960 A1 | 4/2020 | | |
| DE | 102019115232 A1 | 12/2020 | | |
| WO | WO-2016151305 A1 * | 9/2016 | | B62D 5/0403 |

* cited by examiner

GEARBOX ASSEMBLY FOR AN ELECTRIC POWER STEERING APPARATUS

CROSS-REFERENCE TO RELATED APPLICATION

This application claims priority to European Patent Application No. 21461570.0, filed Jul. 23, 2021 and GB Patent Application No. 2111856.7, filed Aug. 18, 2021, the disclosures of each are incorporated herein by reference in their entirety.

TECHNICAL FIELD

This disclosure relates to gearbox assemblies for electric power steering apparatus of the worm and wheel type.

BACKGROUND

Electric power steering systems use an electric motor to produce an assistance torque that is applied to a rotating part of the steering system. In a conventional arrangement this torque assists the driver in turning the wheel. Because motors work best at relatively high speeds and because compact motors produce relatively low torques, the connection between the output of the motor and the steering column is usually through a reduction gearbox.

The most widely used type of electric power assisted steering reduction gearboxes are of a relatively simple worm and gear configuration. The gearbox assembly typically comprises a gearbox housing which houses a worm shaft and a gear wheel. The worm shaft is connected to an output of an electric motor. The motor may be secured to an end face of the housing or even located within the housing. The worm shaft is supported by two bearing assemblies; one on either side of a region where the worm gear of the worm shaft engages the wheel gear. The first bearing assembly in this description is called a main bearing assembly and is located at an end closest to the motor. The second bearing assembly is referred to as a tail bearing assembly and is located at an end furthest from the motor, both bearing assemblies typically comprising bearing elements supported within an inner bearing race that is threaded onto the worm shaft and an outer bearing race that is secured to the housing of the gearbox assembly. The function of the bearing assemblies is to allow the worm shaft to rotate while to a certain degree, limiting axial and radial movement. The gear wheel is connected to an output shaft of the gearbox and located so that teeth of the gear wheel engage teeth of the worm shaft.

It is known that the speed reduction gearboxes used in electrical power-assisted Steering (EPS) apparatus are prone to rattle due to external torsional vibrations acting at their output shafts. These vibrations originate at the road wheels due to surface roughness or unbalanced wheels. Alternatively, mechanical noise can arise from sudden torque reversals applied at the steering wheel by the driver which cause the teeth of the wheel gear to apply a sudden force onto the worm shaft teeth. The main rattle sites in a worm and wheel gearbox are at the engagement of the worm and gear teeth and at the main bearing, closest to the motor, which axially locates the worm shaft.

When there is a zero or low level of transmitted gearwheel torque, rattle between the gear teeth can be suppressed by biasing the worm shaft into mesh with the gearwheel by an external force such as the anti-rattle spring so that the teeth are held in a so-called "dual-flank" contact. i.e., both sides of the engaged teeth on the worm shaft are simultaneously in contact with adjoining tooth flanks on the gear wheel. There is no rotational free play between the gearwheel and the worm shaft in this situation.

To facilitate this movement, the connection between the worm shaft and the motor must allow include a certain amount of freedom of movement. This can be achieved by rounding a tip of an output shaft of the motor and locating this within a complimentary socket in a coupler that is connected to the worm shaft.

SUMMARY

What is needed is an arrangement to ameliorate problems which present during assembly of prior art gearbox assemblies of the kind described above.

According to a first exemplary arrangement, the disclosure provides a gearbox assembly for power take off from an electric motor of an electric power assisted steering apparatus comprising:
  a gearbox housing which houses a worm shaft and a gear wheel,
  the worm shaft incorporating one or more external helical worm teeth,
  a main bearing assembly that supports the worm shaft at an end closest to the motor,
  a tail bearing assembly that supports the worm shaft at an end furthest from the motor,
  in which at least the tail bearing assembly is free to move relative to the housing through a limited range of motion that enables the worm shaft to move radially away from the axis of the wheel gear,
  a piston which is slidingly received within a bore in an end of the worm shaft and which has a head at an end facing the motor which connects with an output shaft for the electric motor, the interface between the recess of the piston and the protrusion of the output shaft defining a pivot axis of the worm shaft,
  and a spring which is located within the bore in the end of the worm shaft and is compressed between the worm shaft and the piston;
  wherein the piston has a tapered shoulder located within the bore that increases in diameter from an end furthest from the motor towards the head, and in that the gearbox assembly further includes an annular o-ring that sits on the tapered shoulder, the spring acting on the piston through the o-ring whereby movement of the worm shaft towards the motor shaft compresses the spring which in turn drives the o-ring along the tapered shoulder until the o-ring becomes wedged between the piston and the inner wall of the bore of the worm shaft.

The gearbox assembly may further comprise a spacer that sits between the o-ring and an end of the spring whereby the spacer in use can transfer axial loads from the spring onto the o-ring. The spacer forms a convenient seat for the spring.

The gearbox may be configured such that during normal operation with no load on the gearbox and motor the seal is spaced from or in light contact with the inner wall of the bore of the worm shaft. This ensures that there is little to no friction between the two parts and the spring does not provide any significant resistance to movement of the worm shaft axially away from the motor shaft.

The o-ring seal may therefore have an external diameter when at rest that is smaller than an internal diameter of the bore in the worm shaft in the region where the o-ring is located in use.

Under no axial load from the spring, the o-ring may have a smaller external diameter than the inner diameter of the bore so that the two do not contact.

As the compression of the spring increases an increasing axial force is applied to the o-ring causing it to expand and move along the shoulder. At a preset load, determined by the properties of the o-ring and the pressure angle of the piston shoulder and the friction between the two, the o-ring will become wedged into the space between piston and bore providing a path for transfer of the axial load directly through the o-ring onto the worm shaft. This wedging action increases the resistance force against movement of the work relative to the motor above the resistance at lower axial loads. Further movement of the worm shaft towards the motor must overcome the friction between the o-ring and the bore of the worm shaft.

At low axial loads, insufficient to drive the o-ring along the piston, all the axial load in the spring may be transferred through the seal onto the piston.

This absorption of the energy by expanding the o-ring and the additional resistance to movement provided by the increased friction between the seal and the bore provide a damping effect to relative movement between the worm shaft and motor shaft that is additional to the static spring loading provided by the spring. This arrangement also allows for a single spring of fixed property to be provided with the movement of the seal along the shoulder ensuring that any tolerances are taken up on assembly without altering the preload provided by the spring.

The o-ring may be a rubber ring or any other elastic material.

The tapered shoulder may have a constant pressure angle alpha which may be between 30 degrees and 60 degrees.

The gearbox may include a coupler which has a first part fixed to the motor shaft and a second part fixed to the worm shaft which is configured to prevent relative rotational movement between the two shafts while permitting some angular deflection around the pivot point.

Each of the two parts of the coupler may comprise a set of dog teeth that inter-engage with dog teeth on the other part to prevent the angular movement.

The piston may comprise an enlarged head of a first external diameter which receives a convex end of the motor shaft and a narrower tail portion of a second smaller external diameter, the head and shoulder connected by the tapered shoulder.

The tail portion or stem of the piston may be located within an end of the spring, with the spring comprising a coil spring.

The recess may be concave and part spherical and the protrusion of the motor shaft may comprise a part spherical end portion of the motor shaft. This "ball and socket" joint between the two parts permits the required pivoting motion to be achieved.

The head of the piston may connect with an output shaft that comprises a part of a rotor of the motor or may comprise a part of the gearbox assembly configured to be secured to the rotor of the motor. The head may include a recess into which a spherical end of this output shaft may be located. The spring in use pushes the head of the piston onto the output shaft removing any free play between then parts.

BRIEF DESCRIPTION OF DRAWINGS

There will now be described, by way of example only, three exemplary arrangements of a gearbox assembly that fall within the scope of the present disclosure with reference to and as illustrated in the accompanying drawings of which.

DETAILED DESCRIPTION

Figure 1:
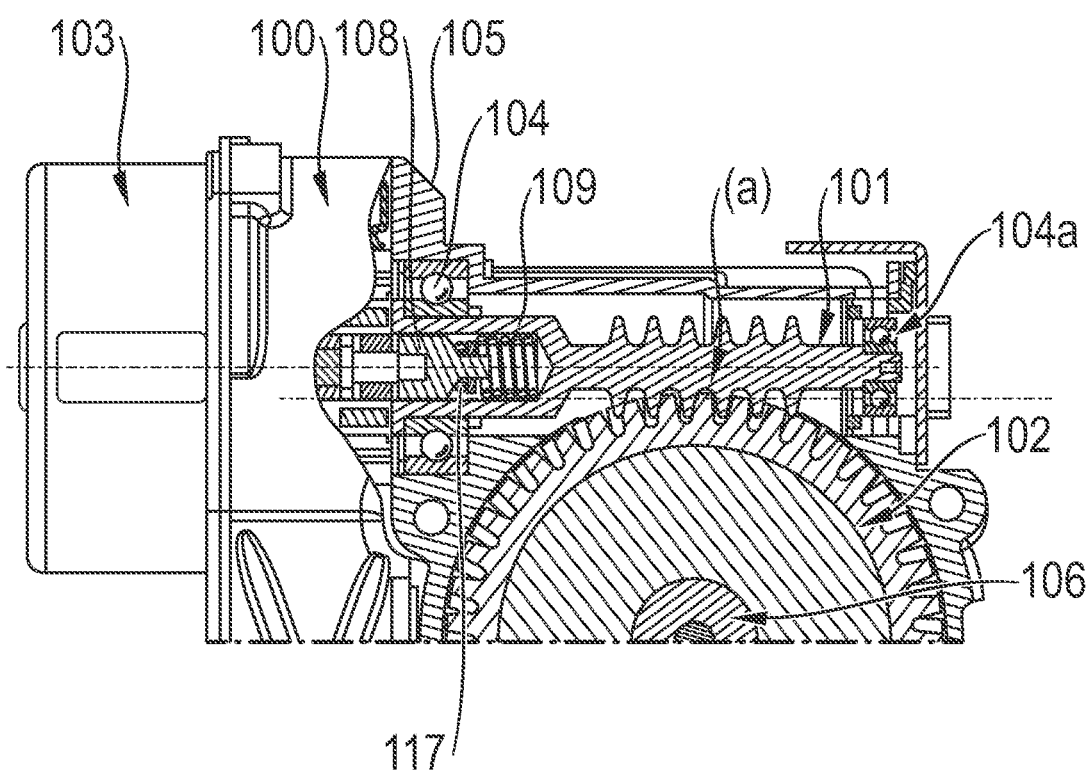
FIG. 1 is cross section view of an exemplary arrangement of a gearbox assembly for an electric power assisted steering system in accordance with an aspect of the disclosure.

FIG. 1 shows a first exemplary arrangement of a gearbox assembly 100 in accordance with an aspect of the disclosure that can be incorporated into an electric power assisted steering apparatus. In use the gearbox assembly provides a geared reduction in the output of an electric motor of the steering apparatus, allowing torque generated by a motor to be transferred to a steering column or rack (or other part of a steering system), the torque assisting a driver to turn the wheel or providing the principle source of steering torque.

The gearbox assembly 100 comprises a gearbox housing 105 which houses a worm shaft 101 and a gear wheel 102. The worm shaft is connected to an output of an electric motor 103 (shown at the far left). The motor 103 may be secured to an end face of the housing 105 or even located within the housing 105. The worm shaft 101 is supported by two bearing assemblies; one either side of a region where a worm gear of the worm shaft 101 engages a wheel gear. A first bearing assembly in this description is called a main bearing assembly 104 and is located at an end closest to the motor 103. A second bearing assembly is referred to as a tail bearing assembly 104a and is located at an end furthest from the motor 103, both bearing assemblies typically comprising bearing elements supported within an inner bearing race that is threaded onto the worm shaft and an outer bearing race that is secured to the housing 105 of the gearbox assembly. The function of the bearing assemblies is to allow the worm shaft to rotate while to a certain degree limiting axial and radial movement. The gear wheel 102 is connected to an output shaft 106 of the gearbox and located so that teeth of the gear wheel engage teeth of the worm shaft.

Figure 2:
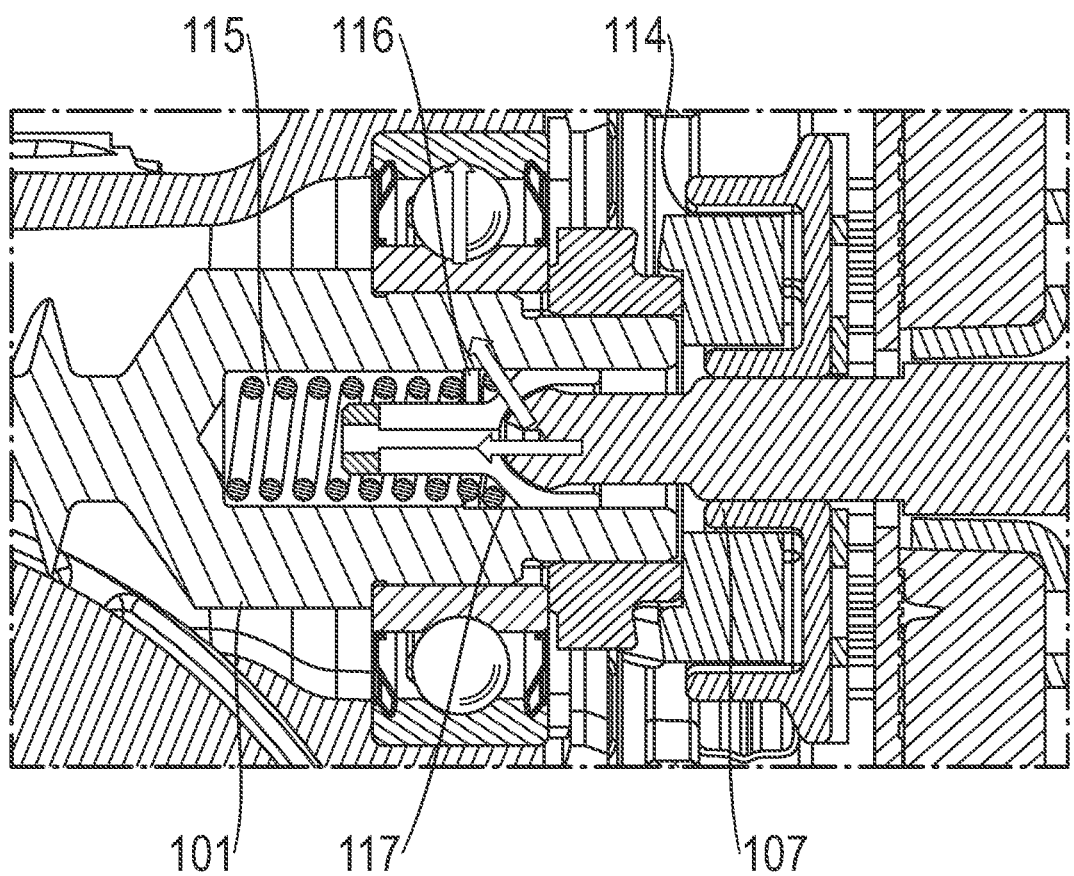
FIG. 2 is an enlarged view of part of FIG. 1 showing the transfer of axial loading from the motor power take off through to the worm shaft along two main paths indicated by the solid block arrows.

The connection of the motor output shaft 107 to the worm shaft 101 is shown in more detail in FIG. 2. The connection is made through a two-piece coupler 114, one piece connected to an end of the worm shaft and the other end to the motor output shaft. The two pieces mesh together to prevent relative rotation between the worm shaft and the motor output shaft, allowing torque to be transferred from one to the other. The coupler allows some relative axial movement between the worm shaft and motor output shaft, as required for tolerances but also to permit some angular displacement of the worm shaft. To control the axial movement between the worm shaft 101 and the motor output shaft the gearbox assembly further comprises a piston 108 which is slidingly received within a bore 109 in an end of the worm shaft. The piston 108 has a stem 110 and an enlarged head 111 which has a recess 112 formed in an end facing the motor which receives a complimentary protrusion of an output shaft of the motor. The recess and ball shaped end of the motor shaft define a pivot axis of the worm shaft.

Figure 4:
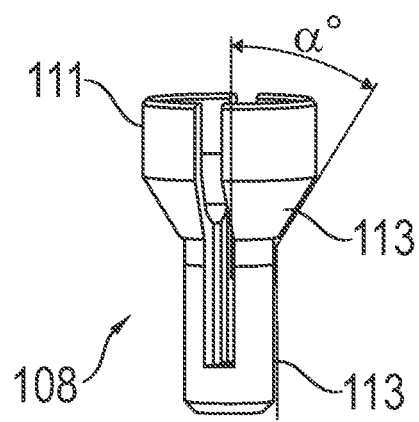

The piston 108 is seen best in FIG. 4 and has a tapered shoulder 113 that connects a slim stem 110 and an enlarged head 111, increasing in diameter constantly from the stem to the head. The stem 110 extends only part way into the recess in the worm shaft 101 and a coil spring 115 is located in the bore. One end of the spring 115 engages a base of the recess in the worm shaft 101 and the other end fits in the cylindrical void between the stem 110 and the inner wall of the bore in the worm shaft. This end contacts an annular washer 116 which is a loose fit around the stem 110. An o-ring 117 is also located into the space between the piston 108 and the bore, being trapped between the spacer 116 and the tapered shoulder 113 of the piston 108. The spring 115 is held in compression and applies an axial load to the connection between the worm shaft 101 and the motor output shaft. Amongst other functions, this helps reduce any rattling of these parts.

An inner diameter of the o-ring 117 when at rest is selected to be smaller than the largest diameter part of the tapered shoulder 113. Thus, when a light load is applied onto the o-ring 117 by the spring 115 it will sit on the tapered shoulder about halfway along the taper. In this condition the outer diameter of the o-ring is smaller than the inner diameter of the bore in the worm shaft, so it does not contact the worm shaft. The o-ring and washer position set the load on the spring.

Figure 3:
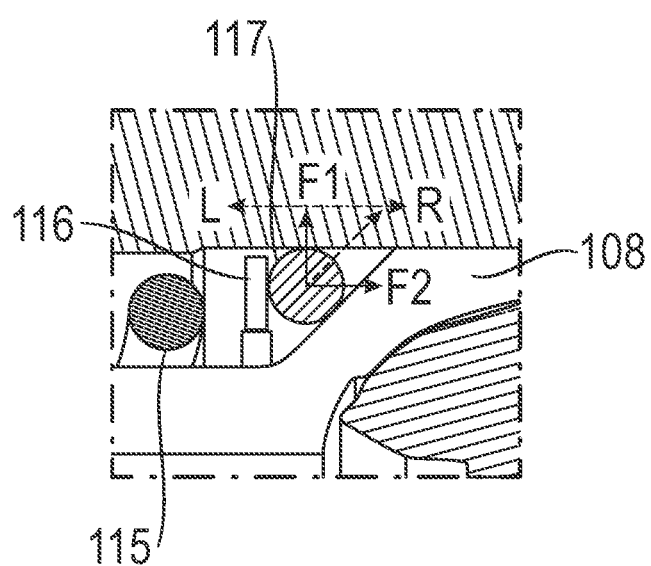
FIG. 3 is a detailed force diagram showing the loading through the o-ring when the worm shaft is forced towards the motor power take off compressing the o-ring, and FIG. 4 show in isolation the piston that is located between the motor power take off and a spring with engages with the worm shaft.

When an increasing axial load is applied that pushes the worm shaft 101 and motor output shaft closer together, the spring 115 will push on the spacer 116 and compress and in resisting this compression a force will be applied onto the spacer 116 which will try to push the o-ring 117 along the tapered shoulder. Due to the pressure angle of the shoulder 113 this generates a force that has two orthogonal components F1 and F2 as shown in FIG. 3.

If the axial force exceeds the force needed to expand the o-ring 117 it will move along the shoulder 113 towards the motor until the forces are all in equilibrium and the o-ring 117 stops moving.

At increasing axial loads the o-ring 117 will have moved far enough along the tapered shoulder and expanded in diameter that it is driven into contact with the inner wall of the bore in the worm shaft 101. At this point, some of the force F1 acts on the worm shaft 101, which generates a friction between the o-ring 117 and worm shaft which increases the resistance to further axial movement of the worm shaft 101 towards the motor output shaft. At this time, the axial force must not only increase the diameter of the o-ring to move it along the shoulder it must overcome compression of the o-ring outer diameter by the inner wall of the bore in the worm shaft.

The applicant has appreciated that the arrangement shown in FIG. 1 enables a simple assembly of a gearbox assembly with a fixed pre-load over a range of component tolerances due to the o-ring acting between the spring and the piston, with this increasing to a higher level when under a high axial load. A good damping of movement is therefore achieved without an excessively high damping being present at low loads.

The invention claimed is:

1. A gearbox assembly for power take off from an electric motor of an electric power assisted steering apparatus comprising:
   a gearbox housing which houses a worm shaft and a gear wheel,
   the worm shaft incorporating one or more external helical worm teeth,
   a main bearing assembly that supports the worm shaft at an end closest to the motor,
   a tail bearing assembly that supports the worm shaft at an end furthest from the motor,
   in which at least the tail bearing assembly is free to move relative to the housing through a limited range of motion that enables the worm shaft to move radially away from an axis of the wheel gear,
   a piston which is slidingly received within a bore in an end of the worm shaft and which has a has a head at an end facing the motor which connects with an output shaft of the motor, an interface between a recess of the piston and a protrusion of the motor shaft defining a pivot axis of the worm shaft,
   and a spring which is located within the bore in the end of the worm shaft and is compressed between the worm shaft and the piston;
   wherein the piston has a tapered shoulder located within the bore that increases in diameter from an end furthest from the motor towards an end nearest the motor, and in that the gearbox assembly further includes an annular o-ring that sits on the tapered shoulder, a spring acting on the piston through the o-ring, whereby movement of the worm shaft towards the motor shaft compresses the spring which in turn drives the o-ring along the tapered shoulder until the o-ring becomes wedged between the piston and an inner wall of the bore of the worm shaft.

2. A gearbox assembly according to claim 1 which is configured such that during a normal operation with no load on the gearbox and motor the o-ring is spaced from or in light contact with the inner wall of the bore of the worm shaft.

3. A gearbox assembly according to claim 2, wherein the o-ring comprises a rubber.

4. A gearbox assembly according to claim 2, in which the tapered shoulder has a constant pressure angle.

5. A gearbox assembly according to claim 1 in which the o-ring comprises a rubber.

6. A gearbox assembly according to claim 1, in which the tapered shoulder has a constant pressure angle.

7. A gearbox assembly according to claim 1, wherein the o-ring comprises an elastic material.

* * * * *